United States Patent
Watanabe et al.

(10) Patent No.: US 10,260,172 B2
(45) Date of Patent: Apr. 16, 2019

(54) CARBON FIBERS, AND PRODUCTION METHOD THEREFOR

(71) Applicant: Toray Industries, Inc., Tokyo (JP)

(72) Inventors: Jun Watanabe, Masaki (JP); Fumihiko Tanaka, Masaki (JP); Takaaki Yamashita, Masaki (JP)

(73) Assignee: Toray Industries, Inc. (JP)

( * ) Notice: Subject to any disclaimer, the term of this patent is extended or adjusted under 35 U.S.C. 154(b) by 125 days.

(21) Appl. No.: 15/123,063

(22) PCT Filed: Mar. 4, 2015

(86) PCT No.: PCT/JP2015/056329
§ 371 (c)(1),
(2) Date: Sep. 1, 2016

(87) PCT Pub. No.: WO2015/133514
PCT Pub. Date: Sep. 11, 2015

(65) Prior Publication Data
US 2017/0067187 A1    Mar. 9, 2017

(30) Foreign Application Priority Data
Mar. 6, 2014 (JP) ................... 2014-043652

(51) Int. Cl.
*D01F 9/22* (2006.01)
*C01B 32/18* (2017.01)
*D01D 5/247* (2006.01)

(52) U.S. Cl.
CPC .............. *D01F 9/225* (2013.01); *C01B 32/18* (2017.08); *D01D 5/247* (2013.01); *D01F 9/22* (2013.01);
(Continued)

(58) Field of Classification Search
CPC .. D01F 9/12–9/328; D01F 6/18; C01B 32/18; C01B 32/02; C01B 31/0293;
(Continued)

(56) References Cited

U.S. PATENT DOCUMENTS

| 4,917,836 A * | 4/1990 | Yamane ..................... D01F 6/18 |
| | | 264/130 |
| 2013/0202873 A1* | 8/2013 | Mizuki .................. C08G 59/38 |
| | | 428/299.1 |

FOREIGN PATENT DOCUMENTS

| EP | 2 415 913 | 2/2012 |
| JP | 3-241014 A | 10/1991 |

(Continued)

OTHER PUBLICATIONS

Supplementary European Search Report dated Jan. 4, 2017, of corresponding European Application No. 15758725.4.

*Primary Examiner* — Camie S Thompson
(74) *Attorney, Agent, or Firm* — DLA Piper LLP (US)

(57) ABSTRACT

Carbon fibers achieve a high elongation percentage and a high tensile modulus of resin-impregnated strands while being lightweight. The carbon fibers are configured such that: the void content in a cross section of the fibers in the axial direction, the cross section including the long axis of a cross section of the fibers in the radial direction, is at least 0.3% by area, but not more than 5.0% by area; the average aspect ratio of the voids is at least 2.0, but not more than 50; and the average width of the voids in the cross section of the fibers in the radial direction is at least 3 nm, but not more than 100 nm.

16 Claims, 1 Drawing Sheet

100 nm (52) U.S. Cl.
CPC .... *D10B 2401/00* (2013.01); *D10B 2401/061* (2013.01); *D10B 2401/062* (2013.01)

(58) Field of Classification Search
CPC .............. D01D 5/247; D10B 2401/062; D10B 2401/061; D10B 2401/00
USPC ........... 428/299.1, 367; 264/182, 206, 210.4, 264/210.8, 29.2
See application file for complete search history.

(56) References Cited

FOREIGN PATENT DOCUMENTS

| | | | |
|---|---|---|---|
| JP | 2001-49524 A | | 2/2001 |
| JP | 2004-76208 A | | 3/2004 |
| JP | 2006-283226 A | | 10/2006 |
| JP | 2010-229573 A | | 10/2010 |
| JP | 2010-255159 A | | 11/2010 |
| JP | 2010255159 A | * | 11/2010 |
| WO | WO-2012039456 A1 | * | 3/2012 ............. C08G 59/38 |

* cited by examiner

CARBON FIBERS, AND PRODUCTION METHOD THEREFOR

TECHNICAL FIELD

This disclosure relates to a carbon fiber suitably used for applications including members for aircraft, members for spacecraft, members for automobiles and members for ships, applications for sports such as golf shafts and fishing rods and applications for other general industries, and a production method therefore. More particularly, the disclosure relates to a carbon fiber having specific voids in the inside thereof and having a high level of elongation and a high level of tensile modulus of resin-impregnated strands while being light in weight, and a production method therefore.

BACKGROUND

Since carbon fibers have a high level of specific strength and a high level of specific tensile modulus, as well as a feature of having a low specific gravity because of including mainly carbon elements, carbon fibers as reinforcing fibers for a composite material are being widely developed to applications for general industries such as automobiles, civil engineering and construction, pressure vessels and windmill blades, as well as conventional applications for sports and applications for aircraft or space, and there has been a high demand to achieve both further technical advancement in performance and cost reduction. In particular, there has been a need for a carbon fiber having a smaller specific gravity, by which the weight is reduced as much as possible, as well as having enhanced mechanical properties, mainly tensile modulus of resin-impregnated strand (hereinafter, referred to simply as strand).

The most widely utilized polyacrylonitrile-based carbon fiber is industrially produced through a stabilization process of converting a polyacrylonitrile-based precursor fiber into a stabilized fiber under an oxidizing atmosphere at 200 to 300° C. and a carbonization process of carbonizing the fiber under an inert atmosphere at 300 to 3000° C. For the purpose of decreasing the specific gravity of the carbon fiber, there is a method of widening the interplanar spacing of the graphite crystallite and a method of lowering the specific gravity of a structure of a portion other than the crystallite.

In Japanese Patent Laid-open Publication No. 3-241014 and Japanese Patent Laid-open Publication No. 2006-283226, there has been proposed a technique of allowing carbon fiber to have a single hollow portion as the core portion thereof to control the apparent specific gravity at a low level.

Moreover, usually, the carbon fiber allows a large number of voids to be contained in the inside of the fiber during the production process. The volume of voids and the size of the voids are important factors in determining the mechanical properties of the carbon fiber and the carbon fiber strand such as the tensile strength thereof and the tensile modulus thereof. As such, from an aspect of attaining the enhancement in physical properties of the carbon fiber, it is important to control the volume of voids and the size of the voids contained in the inside of the carbon fiber.

In Japanese Patent Laid-open Publication No. 2010-229573, there has been proposed a technique of controlling tension applied to a fiber at a temperature within a specific temperature range in a carbonization process to control the volume of voids contained in the inside of the carbon fiber and attaining enhancement of the tensile strength of resin-impregnated strands and the tensile modulus of resin-impregnated strands.

However, in the techniques proposed in Japanese Patent Laid-open Publication No. 3-241014 and Japanese Patent Laid-open Publication No. 2006-283226, while the apparent specific gravity of the carbon fiber is controlled at a low level, the tensile strength of resin-impregnated strands and the tensile modulus of resin-impregnated strands thereof are still insufficient since the carbon fiber having a single hollow portion is a flaw in itself.

Moreover, the technique proposed in Japanese Patent Laid-open Publication No. 2010-229573 seeks to extremely reduce the void amount in the inside of the carbon fiber while maintaining a high level of tensile strength of resin-impregnated strands and a high level of tensile modulus of resin-impregnated strands, and the carbon fiber has not been sufficiently reduced in weight.

Accordingly, there have not been any carbon fibers having high mechanical properties while being light in weight and a production method therefore.

It could therefore be helpful to provide a carbon fiber capable of achieving a high level of elongation and a high level of tensile modulus of resin-impregnated strands while being light in weight.

SUMMARY

We found that, by controlling tension in coagulation during the coagulation process in a spinning process within a specific range, the volume of voids contained in the inside of a polyacrylonitrile-based precursor fiber and the size of the voids can be controlled to a specific volume of voids and a specific size of the voids, respectively, and with regard to a carbon fiber produced through a stabilization process and a carbonization process, the volume of voids and the size of the voids can be similarly controlled within a specific range. We also found that, by controlling the volume of voids and the size of the voids within a specific range, a carbon fiber capable of achieving a high level of elongation and a high level of tensile modulus of resin-impregnated strands while being light in weight can be obtained.

We thus provide a carbon fiber allowing the void content ratio in a cross section in the fiber axis direction including the long axis of a cross section in the fiber diameter direction to be greater than or equal to 0.3% by area and less than or equal to 5.0% by area, allowing the average aspect ratio of the void to be greater than or equal to 2.0 and less than or equal to 50, and allowing the average width of the void in a cross section in the fiber diameter direction to be greater than or equal to 3 nm and less than or equal to 100 nm.

We also provide a production method for the carbon fiber, including the spinning process of allowing a polyacrylonitrile-based spinning dope solution to be spun into fiber through a coagulation process to obtain a polyacrylonitrile-based precursor fiber; the stabilization process of subjecting the polyacrylonitrile-based precursor fiber to a stabilization treatment under an oxidizing atmosphere at 200 to 300° C. to obtain a stabilized fiber; the pre-carbonization process of subjecting the stabilized fiber to a pre-carbonization treatment under an inert atmosphere at 500 to 1200° C. to obtain a pre-carbonized fiber; and the carbonization process of subjecting the pre-carbonized fiber to a carbonization treatment under an inert atmosphere at 1200 to 3000° C. to obtain a carbon fiber, wherein the tension in the coagulation during the coagulation process in the spinning process is greater than or equal to 1.0 mN/dtex and less than or equal to 2.5 mN/dtex.

The carbon fiber has a high level of elongation and a high level of tensile modulus of resin-impregnated strands while being light in weight.

Moreover, according to the production method, since the tension in coagulation during the coagulation process in the spinning process is controlled within a specific range, it is possible to control the volume of voids contained in the inside of a polyacrylonitrile-based precursor fiber and the size of the voids to a specific volume of voids and a specific size of the voids, respectively, and with regard to a carbon fiber produced through a stabilization process and a carbonization process, since the volume of voids and the size of the voids can be similarly controlled within a specific range, it is possible to obtain a carbon fiber capable of achieving a high level of elongation and a high level of tensile modulus of resin-impregnated strands while being light in weight.

DETAILED DESCRIPTION

Figure 1:
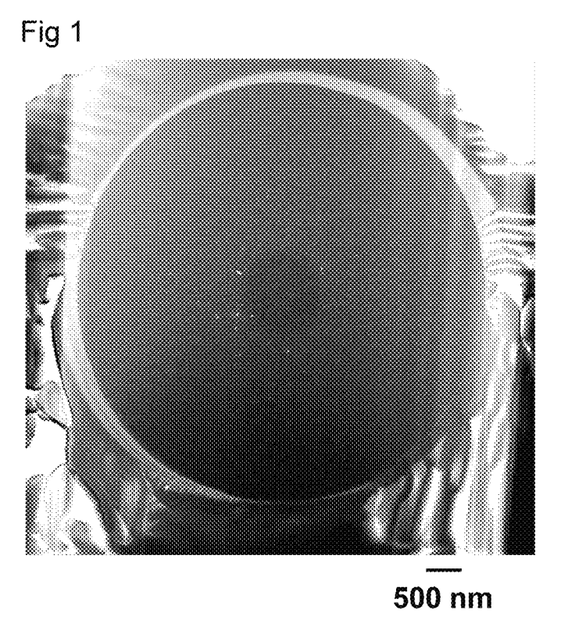
FIG. 1 shows a TEM image of a cross section in the fiber diameter direction of a carbon fiber.
Figure 2:
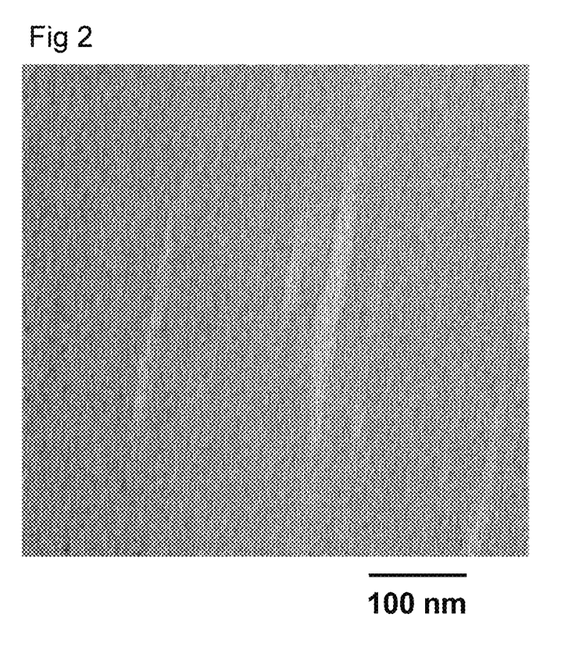
FIG. 2 shows a TEM image of a cross section in the fiber axis direction of a carbon fiber.

The carbon fiber is allowed to have a lowered specific gravity while suppressing the lowering in mechanical properties by allowing voids with a specific shape to be contained in the inside of a high-performance carbon fiber.

Voids with a specific shape contained in the inside of the carbon fiber will be described.

With regard to voids contained in the inside of the carbon fiber, the average width thereof in a cross section in the fiber diameter direction is greater than or equal to 3 nm and less than or equal to 100 nm, preferably greater than or equal to 3 nm and less than or equal to 50 nm and more preferably greater than or equal to 3 nm and less than or equal to 30 nm. In this connection, the fiber diameter direction refers to the direction of the fiber diameter of a carbon fiber and the fiber axis direction refers to the direction of the fiber axis of a carbon fiber. The fiber diameter direction and the fiber axis direction are orthogonal to each other. When the average width of the void contained in the inside of the carbon fiber in a cross section in the fiber diameter direction is smaller than 3 nm, there is a high possibility that a void capable of affecting the specific gravity of the carbon fiber hardly exists in the inside of the carbon fiber, that is, the specific gravity fails to be lowered. On the other hand, when the average width of the void contained in the inside of the carbon fiber in a cross section in the fiber diameter direction is larger than 100 nm, since there is a high possibility that a large number of voids with a certain size capable of becoming a flaw serving as an origin of the fiber fracture exist, the tensile modulus of resin-impregnated strands and the elongation of the carbon fiber are remarkably lowered.

The average width of the void contained in the inside of the carbon fiber in a cross section in the fiber diameter direction is determined as follows. First, using a focused ion beam (FIB), a thin section of the carbon fiber with a thickness of 100 nm is prepared along the direction perpendicular to the fiber axis thereof, and a cross section in the fiber diameter direction of the carbon fiber is observed with a transmission electron microscope (TEM) at ten thousand magnifications. The white portion in the observed image is defined as a void, the length of the longest distance from one end to the other end of the void is defined as a width of the void in a cross section in the fiber diameter direction, and the arithmetic average value of all measured voids is defined as an average width of the void in a cross section in the fiber diameter direction. In this connection, the measurement is performed throughout the cross section in the fiber diameter direction of a carbon fiber, and three cross sections are measured therefore.

With regard to voids contained in the inside of the carbon fiber, the average aspect ratio thereof in a cross section in the fiber axis direction including the long axis of a cross section in the fiber diameter direction is greater than or equal to 2.0 and less than or equal to 50, preferably greater than or equal to 4.0 and less than or equal to 50 and more preferably greater than or equal to 10 and less than or equal to 50. When the average aspect ratio of the void in a cross section in the fiber axis direction is smaller than 2.0, since the stress becomes easy to be concentrated on the void, the tensile modulus of resin-impregnated strands and the elongation of the carbon fiber are remarkably lowered. On the other hand, the larger the average aspect ratio of the void in a cross section in the fiber axis direction is, the more preferred the fiber is, because the stress concentration can be suppressed, but an effect commensurate with the increment is not attained from around the time when the aspect ratio exceeds 50.

The average aspect ratio of the void in a cross section in the fiber axis direction is determined as follows. First, using a focused ion beam (FIB), a thin section of the carbon fiber with a thickness of 100 nm is prepared along the fiber axis direction thereof to include the long axis of a cross section in the fiber diameter direction thereof, and a cross section in the fiber axis direction of the carbon fiber is observed with a transmission electron microscope (TEM) at ten thousand magnifications. In this context, a straight line with the longest distance from one surface to the other surface of a carbon fiber is defined as the long axis of a cross section in the fiber diameter direction of the carbon fiber. In this connection, "from one surface to the other surface of a carbon fiber" refers to "from one point on the outer periphery to the other point on the outer periphery in a cross section in the fiber diameter direction of the carbon fiber". The white portion in an observed image is defined as a void with regard to the length of the longest distance from one end to the other end of the void, the length in the direction perpendicular to the fiber axis is defined as a width in the diameter direction of the void, and the length in the fiber axis direction is defined as a length in the fiber axis direction of the void. Furthermore, the value obtained by dividing the width in the fiber diameter direction of the void by the length in the fiber axis direction of the void is defined as an aspect ratio of the void, and the arithmetic average value for the aspect ratio of all measured voids is defined as an average aspect ratio of the void. In this connection, the measurement is performed over the whole face of a portion of a length of 2.1 μm in the fiber axis direction of a carbon fiber, and three cross sections are measured therefore.

The void content ratio in a cross section in the fiber axis direction including the long axis of a cross section in the fiber diameter direction is greater than or equal to 0.3% by area and less than or equal to 5.0% by area, preferably greater than or equal to 0.3% by area and less than or equal to 3.0% by area and more preferably greater than or equal to 0.3% by area and less than or equal to 2.0% by area. When the void content ratio in a cross section in the fiber axis direction is less than or equal to 0.3% by area, a void hardly exists in the inside of the carbon fiber, that is, the specific gravity fails to be lowered. On the other hand, when the void content ratio in a cross section in the fiber axis direction is greater than or equal to 5.0% by area, a weak structure is formed in the inside of the carbon fiber since the volume of void portions becomes very large, and the tensile modulus of resin-impregnated strands and the elongation of the carbon fiber are remarkably lowered.

The void content ratio in a cross section in the fiber axis direction is determined as follows. First, using a focused ion beam (FIB), a thin section of the carbon fiber with a thickness of 100 nm is prepared along the fiber axis direction thereof to include the long axis of a cross section in the fiber diameter direction thereof, and a cross section in the fiber axis direction of the carbon fiber is observed with a transmission electron microscope (TEM) at ten thousand magnifications. In this context, a straight line with the longest distance from one surface to the other surface of a carbon fiber is defined as the long axis of a cross section in the fiber diameter direction of the carbon fiber. The white portion in an observed image is defined as a void with regard to the length of the longest distance from one end to the other end of the void, the length in the direction perpendicular to the fiber axis is defined as a width in the diameter direction of the void, and the length in the fiber axis direction is defined as a length in the fiber axis direction of the void. The shape of the void is assumed to be an elliptical shape and the void content ratio is calculated from the following equation. In this connection, the measurement is performed over the whole face of a portion of a length of 2.1 µm in the fiber axis direction of a carbon fiber, and three cross sections are measured therefore.

Void content ratio (% by area)=Σ{(width in diameter direction of respective voids (µm)/2×(length in fiber axis direction of respective voids (µm)/2× π}/{carbon fiber diameter (µm)×2.1(µm)}

It is preferred that 80% or more of the number of voids on a cross section in the fiber diameter direction be contained in a region within a distance of 2.0 µm from the midpoint of the long axis of the cross section in the fiber diameter direction. Since a carbon fiber usually has a tensile modulus distribution in a direction from the fiber surface layer to the center, it has been known that the stress is more concentrated on the surface layer side. When 80% or more of the number of voids on a cross section in the fiber diameter direction are contained in a region within a distance of 2.0 µm from the midpoint of the long axis of the cross section in the fiber diameter direction, a void does not act as a flaw since the stress becomes difficult to be concentrated on the void, and a high level of tensile modulus of resin-impregnated strands and a high level of elongation of carbon fiber are developed. Accordingly, the density of voids at a region within a distance of 2.0 µm from the midpoint of the long axis of the cross section in the fiber diameter direction is higher than the density of voids at a region apart therefrom by a distance of greater than 2.0 µm. In this connection, the density of voids is calculated according to the formula of number of voids/Area of region. In this context, in a cross section in the fiber diameter direction, voids with a width of less than 1 nm are not used in the calculation for the density of voids. Moreover, the shape of a cross section in the fiber diameter direction is a shape capable of including the whole circle having its center at the midpoint of the long axis of the cross section in the fiber diameter direction and having a radius of 2.0 µm. Furthermore, for the purpose of suppressing the stress concentration on the void, it is more preferred that 80% or more of the number of voids on a cross section in the fiber diameter direction be contained in a region within a distance of 1.8 µm from the midpoint of the long axis of the cross section in the fiber diameter direction.

The distance from the midpoint of the long axis of a cross section in the fiber diameter direction to a void on the cross section in the fiber diameter direction is determined as follows. First, using a focused ion beam (FIB), a thin section of the carbon fiber with a thickness of 100 nm is prepared along the direction perpendicular to the fiber axis thereof, and a cross section in the fiber diameter direction of the carbon fiber is observed with a transmission electron microscope (TEM) at ten thousand magnifications. In this context, a straight line with the longest distance from one surface to the other surface of a carbon fiber is defined as the long axis, and a point bisecting the straight line is defined as the midpoint of the long axis. The white portion in an observed image is defined as a void, and when a straight line is drawn between the midpoint of the long axis of a cross section in the fiber diameter direction of the carbon fiber and a void, the length of the straight line with the shortest distance is defined as the distance from the midpoint of the long axis of the cross section in the fiber diameter direction to the void. In this connection, the measurement is performed throughout the cross section in the fiber diameter direction of a carbon fiber, and three cross sections are measured therefore.

It is preferred that the shape of a cross section in the fiber diameter direction of a single fiber of the carbon fiber be an almost circular shape or an almost elliptical shape having no dent portion on the outer periphery of the cross section. When the shape of a cross section in the fiber diameter direction of a single fiber is an almost circular shape or an almost elliptical shape having no dent portion at an outer periphery part, the volume of voids and the size of the voids become easy to be controlled within a specific range, and when being made into a carbon fiber-reinforced composite material, mechanical properties become difficult to be lowered. In this connection, the dent portion refers to a dent with a depth of greater than or equal to 0.5 µm. In this context, the dent refers to a region, when a tangential line drawn at a point on the outer periphery of a cross section in the fiber diameter direction passes through the outer side of the cross section and is brought into contact with another point on the outer periphery, that is, when a tangential line allowed to pass through the outer side of the cross section and to be brought into contact with two or more points on the outer periphery of the cross section can be drawn, which is surrounded by the tangential line and the outer periphery of the cross section in the fiber diameter direction. Moreover, the depth refers to a length of the maximum distance from a point on the outer periphery of a cross section in the fiber diameter direction and on the outer periphery of a dent region to a tangential line constituting the outer periphery of the dent region.

The tensile modulus of resin-impregnated strands of the carbon fiber is greater than or equal to 220 GPa and less than or equal to 400 GPa, preferably greater than or equal to 250 GPa and less than or equal to 380 GPa and more preferably greater than or equal to 280 GPa and less than or equal to 350 GPa. When the tensile modulus of resin-impregnated strands is greater than or equal to 220 GPa and less than or equal to 400 GPa, when being made into a carbon fiber-reinforced composite material, high mechanical properties can be developed.

The tensile modulus of resin-impregnated strands can be determined according to the following procedure in accordance with a resin-impregnated strand testing method described in JIS-R-7608 (2004). That is, as the resin formulation, a blend of "CELLOXIDE (registered trademark)" 2021P (available from Daicel Chemical Industries, Ltd.)/boron trifluoride monoethylamine (available from Tokyo Chemical Industry Co., Ltd.)/acetone=10/3/4 (parts by mass) is used, and as the curing condition, the condition of atmospheric pressure, 130° C. and 30 minutes is used. Ten strands of the carbon fiber are measured therefore, and an average value of ten measured values is defined as the tensile modulus of resin-impregnated strands. Although the tensile modulus of resin-impregnated strands usually varies with the strain, the strain range is 0.45 to 0.85% to be evaluated therefore.

Elongation of the carbon fiber is greater than or equal to 1.7% and less than or equal to 2.7%, preferably greater than or equal to 1.8% and less than or equal to 2.5% and more preferably greater than or equal to 1.9% and less than or equal to 2.3%. When the elongation is smaller than 1.7%, the strength of the fiber is remarkably lowered, and when being made into a carbon fiber-reinforced composite material, sufficient mechanical properties cannot be attained. On the other hand, when the elongation is larger than 2.5%, since the fracture of the resin becomes dominant when being made into a carbon fiber-reinforced composite material, high mechanical properties of the carbon fiber cannot be utilized and, as a result, sufficient mechanical properties cannot be attained when being made into a carbon fiber-reinforced composite material.

The evaluation is performed in the same manner as that for the tensile modulus of resin-impregnated strands, ten strands of the carbon fiber are measured therefore, and an average value of the elongation at the time of being applied with the maximum load is used.

Next, the production method for the carbon fiber will be described.

For the purpose of controlling the volume of the voids and the size of the voids in a carbon fiber, it is necessary to control voids in the inside of a precursor fiber for carbon fiber. It is difficult for carbonization to control voids with a size greater than or equal to a certain size, not causing the specific gravity to be appreciably lowered. The control of voids in a precursor fiber for carbon fiber is achieved by controlling the phase separation unit at the time of allowing a polyacrylonitrile (hereinafter, sometimes referred to as PAN)-based polymer solution to be coagulated, that is, allowing the polymer and the solvent to be phase-separated. Usually, in producing a carbon fiber precursor, the phase separation unit is controlled to become small, and at the time of removing the solvent (there are many cases in which the solvent is substituted with water) in a drying process, the space into which the solvent was trapped is crushed to not allow the void to be contained. As such, for the purpose of embedding voids, which are uniformly controlled in the carbon fiber, it is preferred that the phase separation unit at the time of the coagulation be controlled. And then, for the purpose of controlling the phase separation unit at the time of coagulation, it is necessary to allow the phase separation state to be changed by drawing the fiber when the coagulation is in progress.

It is preferred that the coagulation value be 30 to 40 g, and it is more preferred that the coagulation value be 33 to 40 g. The coagulation value is defined as a coagulation bath liquid amount (g) required to gradually add a coagulation bath liquid dropwise to a solution prepared by dissolving 1% by mass of a polymer used for spinning in 50 ml of a solvent used for spinning and allowing the solution to turn from transparent to white and turbid since formation of precipitates is allowed to start. In the test, the temperature is adjusted to 25° C. When a coagulation bath liquid itself is added dropwise to a solution, the white turbidity may become thin because the coagulation bath liquid is excessively diluted and this causes the judgment in the white turbidity starting point to become difficult and, alternatively, from the white turbidity point determined by adding only a coagulation promoting component in the coagulation bath liquid dropwise to the solution, the coagulation promoting component amount can be converted into a coagulation bath liquid amount containing the required coagulation promoting component amount to calculate the coagulation value. When the two values are different, the latter is defined as the coagulation value. The coagulation value also varies with the molecular weight of the polymer, copolymerization composition thereof, concentration of the polymer solution, kind of the solvent, kind of the coagulation promoting component, and concentration of the solvent. It is necessary to measure values under the respective spinning conditions and, in particular, it is preferred that the coagulation value be controlled by the kind of the solvent and the concentration of the solvent in a coagulation bath. The more the concentration of the solvent is heightened, the more the coagulation value is heightened since the coagulation promoting component amount is reduced. When the coagulation value is less than 30 g, it becomes difficult to allow precursors of voids to be formed because the coagulation makes excessively fast progress, and when the coagulation value is greater than 40 g, physical properties of the carbon fiber are lowered because the coagulation makes excessively slow progress. By allowing the coagulation value to lie within a preferred range, it is possible to mainly control the width of a void in the fiber diameter direction of the carbon fiber and the volume of the void. The coagulation value also concerns the copolymerized component and the coagulation promoting component, and when PAN containing no copolymerized component is dissolved in each of various solvents and water is adopted as the coagulation promoting component to research the respective coagulation values, there is a general tendency for the solvents in the order of dimethylacetamide<dimethylformamide<dimethyl sulfoxide<an aqueous zinc chloride solution<an aqueous sodium thiosulfate solution to require a larger amount of the coagulation promoting component. Although the value also varies with the copolymerized component and the like, when PAN, which includes 100% of AN and has an Mw of three hundred twenty thousand, is used and dissolved in each of various solvents and water is adopted as the coagulation promoting component, coagulation values by the respective solvents exhibit different values of 4 g by dimethylacetamide, 5 g by dimethyl sulfoxide, 10 g by an aqueous zinc chloride solution (aqueous 60% by mass solution) and 20 g by an aqueous sodium thiosulfate solution (aqueous 54% by mass solution), respectively. In particular, dimethylacetamide is preferably used because, even if smaller in amount of the coagulation promoting component, coagulated fiber in the same coagulation state can be formed, and dimethylacetamide has an advantage of enabling the amount of the coagulation promoting component to be reduced. When dimethylformamide or dimethylacetamide is used as the solvent, the concentration of the solvent in the coagulation bath preferably lies within the range of 60 to 80% by mass and more preferably lies within the range of 65 to 75% by mass.

It is preferred that the coagulation bath temperature be 0 to 45° C. The coagulation bath temperature affects the diffusion speed of the solvent in the coagulation bath and the diffusion speed of the coagulation promoting component into a spinning dope solution. As a result thereof, the lower the coagulation bath temperature is, the denser the coagulated fiber becomes, and a high-strength carbon fiber is obtained. Moreover, although the measurement itself for the coagulation value is performed under a constant temperature, since the higher the temperature is, the higher the coagulation value becomes, when forcibly changed to be measured therefore, the temperature needs only to be appropriately set to keep the balance thereof. The coagulation bath temperature is more preferably 5 to 40° C. and further preferably 15 to 35° C.

Moreover, coagulated fiber is mechanically applied with tension preferably at the end of 0.1 to 0.5 second after a PAN solution is immersed in the coagulation bath, and this enables the PAN solution in a semi-coagulated state to be drawn. Examples of a method of applying tension thereto include a method of taking advantage of the friction force between coagulated fiber and a guide at the time of allowing the traveling direction of a PAN solution extruded downward to be changed to the upward traveling direction of the coagulated fiber by the guide in a coagulation bath. As such, controlling the timing of mechanically applying coagulated fiber with tension can be achieved by controlling the depth from the liquid surface to the guide in the coagulation bath. When the time period is 0.1 to 0.5 second, since tension is applied to the fiber in a moderately coagulated state, it is possible to control the width of a void in the fiber diameter direction and the volume of the void. When the time period is shorter than 0.1 second, that is, the coagulation makes excessively slow progress, coarse voids are formed and physical properties of the carbon fiber are lowered. When the time period is longer than 0.5 second, that is, the coagulation makes excessively fast progress, it becomes difficult to allow precursors of voids to be formed, and it is good for the time period until the coagulated fiber is applied with tension to be set to lie within the above-mentioned range.

For the purpose of controlling the phase separation unit at the time of the coagulation, it is preferred that the tension in the coagulation be controlled. The tension in the coagulation means an average value of measured values obtained by measuring the tension two times in the vicinity of a point from which coagulated fiber is allowed to travel out of the coagulation bath in the coagulation process. The tension can be determined by sandwiching traveling coagulated fiber by a tensiometer to be measured for a load and dividing the load by the fineness (dtex) of the process coagulated fiber at a measuring point. The tension in the coagulation is greater than or equal to 1.0 mN/dtex and less than or equal to 2.5 mN/dtex, more preferably greater than or equal to 1.5 mN/dtex and less than or equal to 2.5 mN/dtex and further preferably greater than or equal to 1.8 mN/dtex and less than or equal to 2.2 mN/dtex. When smaller than 1.0 mN/dtex, the aspect ratio of the void in the carbon fiber fails to be heightened. On the other hand, when larger than 2.5 mN/dtex, an effect, by which the aspect ratio of the void in the carbon fiber is heightened, commensurate with the increment is not attained and the tensile modulus of resin-impregnated strands and the elongation are lowered. The tension in the coagulation can be appropriately set depending on the modification of the angle of the traveling direction of coagulated fiber, the contact area between coagulated fiber and a guide in the coagulation bath, the frictional coefficient control by a surface treatment for a guide in the coagulation bath, and the like.

For the purpose of controlling the distance from the midpoint of the long axis of a cross section in the fiber diameter direction to a void contained in the inside of the carbon fiber, the coagulation value with which the above-described coagulated state is exhibited, the time period until applied with tension in the coagulation and the tension in the coagulation need only to be appropriately set to keep the balance thereof, and it is preferred that the value be set to lie within the above-described range. By applying a high level of tension in the coagulation to a fiber in a state of allowing coagulation to progress at the outer side portion of the fiber and to progress insufficiently at the inner side portion of the fiber, it is possible to control positions of voids contained in the inside of the carbon fiber.

Hereinafter, a method of allowing a carbon fiber to satisfy mechanical properties corresponding to those of the carbon fiber will be described.

The polyacrylonitrile-based polymer refers to a polymer allowing at least acrylonitrile (hereinafter, sometimes referred to as AN) to be a major constituent component of the polymer unit, and being a major constituent component usually refers to accounting for 85 to 100 mol % of the polymer unit.

From the viewpoint of enhancement in spinning properties, the viewpoint of efficiently performing a stabilization treatment and the like, the polyacrylonitrile-based polymer suitably used in the production of a carbon fiber contains a copolymerized component. In general, when the amount of the copolymerized component is decreased, the stabilization reaction becomes heterogeneous and, moreover, when the amount of the copolymerized component is increased, the portion itself may be thermally degraded and detected as a flaw of the carbon fiber. The preferred amount of the copolymerized component is 0.1 to 0.5% by mass. From the above-mentioned viewpoints, examples of the copolymerized component preferably include a component having one or more carboxyl group(s) or amide group(s). For the purpose of preventing the lowering in heat resistance, it is preferred that a small amount of a monomer high in stabilization promoting effect be used, and it is preferred that a copolymerized component having a larger number of carboxyl groups than that of amide groups be used. Moreover, it is more preferred that the number of carboxyl groups or amide groups contained therein be two or more rather than one, and from the viewpoint thereof, preferred are acrylic acid, methacrylic acid, itaconic acid, crotonic acid, citraconic acid, ethacrylic acid, maleic acid and mesaconic acid, more preferred are itaconic acid, maleic acid and mesaconic acid, and most preferred is itaconic acid.

As the polymerization method of producing a polyacrylonitrile-based polymer, a known polymerization method can be selected. A spinning dope solution suitably used in the production of the carbon fiber is prepared by dissolving the above-mentioned polyacrylonitrile-based polymer in a solvent such as dimethyl sulfoxide, dimethylformamide and dimethylacetamide in which a polyacrylonitrile-based polymer is soluble.

The production method for a polyacrylonitrile-based precursor fiber suitably used in the production of the carbon fiber includes a coagulation process of extruding a spinning dope solution from a spinning spinneret by a dry-wet spinning method to be spun into fiber, a water washing process of washing the fiber obtained in the coagulation process in a water bath, a water bath-drawing process of drawing the fiber obtained in the water washing process in a water bath, a drying/heat treating process of subjecting the fiber obtained in the water bath-drawing process to drying/ heat treating, and an optional steam drawing process of subjecting the fiber obtained in the drying/heat treating process to steam drawing. In this connection, a series of processes mentioned above for producing a polyacrylonitrile-based precursor fiber is referred to as the spinning process.

In the water washing process, it is preferred that the fiber be washed with water using a water washing bath including plural stages of water bath temperatures of 20 to 100° C. Moreover, it is preferred that the draw magnification in the water bath-drawing process be 2 to 6 times. For the purpose of preventing the bonding between two different single fibers after the water bath-drawing process, it is preferred that the fiber be imparted with an oil agent including silicone and the like. With regard to the silicone oil agent, it is preferred that modified silicone be used, and it is preferred that an oil agent containing amino-modified silicone which is high in heat resistance be used.

By allowing the steam drawing to be performed after the above-mentioned water washing process, the water bath-drawing process, an oil agent imparting process and a drying/heat treating process performed by a known method, a polyacrylonitrile-based precursor fiber suitably used in the production of a carbon fiber is obtained. With regard to the steam drawing, it is good for the fiber in pressurized steam to be drawn by at least 2 times or more.

In a method of suitably producing the carbon fiber, the above-mentioned polyacrylonitrile-based precursor fiber is stabilized, pre-carbonized and carbonized to obtain a carbon fiber.

It is preferred that stabilization of a polyacrylonitrile-based precursor fiber be performed at a high temperature as much as possible within a range not causing a runaway reaction and, specifically, it is preferred that the stabilization be performed in air at 200 to 300° C. The treatment time for the stabilization process can be appropriately 10 to 100 minutes, and for the purpose of enhancing the mechanical properties of the resulting carbon fiber, it is preferred that the treatment time be set to allow the specific gravity of the resulting stabilized fiber to be 1.3 to 1.4.

The pre-carbonization is performed subsequently to the above-mentioned stabilization. In the pre-carbonization process, it is preferred that the stabilized fiber obtained be subjected to a heat treatment in an inert atmosphere at the maximum temperature of 500 to 1200° C. until the specific gravity becomes 1.5 to 1.8 to obtain a pre-carbonized fiber.

The carbonization is performed subsequently to the above-mentioned pre-carbonization. In the carbonization process, it is preferred that the pre-carbonized fiber obtained be treated in an inert atmosphere at the maximum temperature of 1200 to 3000° C. to obtain a carbon fiber.

Although it is preferred that the temperature during the carbonization process be high from the viewpoint of heightening the tensile modulus of resin-impregnated strands of the resulting carbon fiber, the strength in a high-strength region may be lowered when the temperature is too high, and it is good for the temperature to be set in consideration of the two. A more preferred temperature range is 1200 to 1800° C. and a further preferred temperature range is 1200 to 1600° C.

After the carbonization process, the carbon fiber obtained can also be subjected to an electrochemical treatment for the surface reforming thereof. It is preferred that the electrochemical treatment be performed by a known procedure. Specifically, as an electrochemical solution used for the electrochemical treatment, an aqueous solution prepared from an acidic solution such as sulfuric acid, nitric acid and hydrochloric acid, an alkali such as sodium hydroxide, potassium hydroxide, tetraethylammonium hydroxide, ammonium carbonate and ammonium bicarbonate or a salt thereof can be used. In this context, the amount of electricity required for the electrochemical treatment can be appropriately selected depending on the carbonization degree of a carbon fiber to be subjected thereto. By virtue of the electrochemical treatment, the bonding property between a carbon fiber and a matrix in the resulting composite material can be made appropriate, the fracture of the brittle composite material due to excessively strong bonding, a problem that the tensile strength in the fibrous direction is lowered, and a problem that the strength characteristics in the nonfibrous direction are not exerted since the fiber is poor in bonding property to the resin while the tensile strength in the fibrous direction is high are eliminated and, in the resulting composite material, the strength characteristics balanced in both directions of the fibrous direction and nonfibrous direction come to be exerted.

After the electrochemical treatment, for the purpose of imparting the carbon fiber obtained with converging properties, the carbon fiber can also be subjected to a sizing treatment. It is preferred that the sizing treatment be performed by a known procedure. As the sizing agent, a sizing agent which is well compatible with a matrix resin can be appropriately selected depending on the kind of the matrix resin used in the composite material.

The measurement methods for respective physical property values described in this disclosure are as follows.

Void Evaluation

The average width of the void contained in the inside of the carbon fiber in a cross section in the fiber diameter direction is determined as follows. First, using a focused ion beam (FIB), a thin section of the carbon fiber with a thickness of 100 nm is prepared along the direction perpendicular to the fiber axis thereof, a cross section in the fiber diameter direction of the carbon fiber is observed with a transmission electron microscope (TEM) at ten thousand magnifications, and the image processing is performed against a TEM observed image by the following procedures (A) to (C).

(A) The TEM observed image observed at ten thousand magnifications is further enlarged by 34 times, and using the JTrim, the intensity to be applied thereto is set to 50 to perform the noise processing.

(B) Using the JTrim, the normalization processing is performed against the image obtained in (A).

(C) Using the JTrim, the threshold value of a boundary is set to 130 to 160 and the binarization processing is performed against the image obtained in (B).

The white portion in an image obtained from the image processing performed by the foregoing procedures (A) to (C) is defined as a void, and the image processing software ImageJ is used to measure the length of the longest distance from one end to the other end of the respective voids, the measured values are defined as widths of the respective voids in the fiber diameter direction, and the arithmetic average value of all measured voids is defined as an average width of the void in a cross section in the fiber diameter direction. The length of the longest distance from one end to the other end of the respective voids is visually determined and, as a result of allowing the evaluation to be performed three times continuously, a length with the longest distance is used. In this connection, a single fiber of the carbon fiber to be measured is randomly sampled from single fibers of the carbon fiber. The measurement is performed throughout the cross section in the fiber diameter direction of a carbon fiber, and three cross sections are measured therefore. Moreover, voids with a width of less than 1 nm are not used in the calculation of the average width.

The average aspect ratio of the void in a cross section in the fiber axis direction including the long axis of a cross section in the fiber diameter direction is determined as follows. First, using a focused ion beam (FIB), a thin section of the carbon fiber with a thickness of 100 nm is prepared along the fiber axis direction thereof to include the long axis of a cross section in the fiber diameter direction thereof, a cross section in the fiber axis direction of the carbon fiber is observed with a transmission electron microscope (TEM) at ten thousand magnifications, and the image processing is performed by the foregoing procedures (A) to (C). The white portion in an image obtained from the image processing performed by the foregoing procedures (A) to (C) is defined as a void, and the image processing software ImageJ is used to perform the measurement.

A straight line with the longest distance from one surface to the other surface in the direction perpendicular to the fiber axis direction of a carbon fiber sampled is defined as the long axis of a cross section in the fiber diameter direction of the carbon fiber. The long axis is visually determined and, as a result of allowing the evaluation to be performed three times continuously, a straight line with the longest distance is used. With regard to the length of the longest distance from one end to the other end of the void, the length in the direction perpendicular to the fiber axis is defined as a width in the diameter direction of the void, and the length in the fiber axis direction is defined as a length in the fiber axis direction of the void. The length of the longest distance from one end to the other end of the void is visually determined and, as a result of allowing the evaluation to be performed three times continuously, a length with the longest distance is used. Furthermore, the value obtained by dividing the width in the fiber diameter direction of the void by the length in the fiber axis direction of the void is defined as an aspect ratio of the void, and the arithmetic average value of all measured voids is defined as an average aspect ratio of the void. In this connection, a single fiber of the carbon fiber to be measured is randomly sampled from single fibers of the carbon fiber. The measurement is performed over the whole face of a portion of a length of 2.1 µm in the fiber axis direction of a carbon fiber, and three cross sections are measured therefore. Moreover, when the width in the diameter direction of a void or the length in the fiber axis direction of a void is less than 1 nm, the void is not used in the calculation of the average aspect ratio.

The void content ratio in the inside of a carbon fiber is determined as follows. First, using a focused ion beam (FIB), a thin section of the carbon fiber with a thickness of 100 nm is prepared along the fiber axis direction thereof to include the long axis of a cross section in the fiber diameter direction thereof, a cross section in the fiber axis direction of the carbon fiber is observed with a transmission electron microscope (TEM) at ten thousand magnifications, and the image processing is performed by the foregoing procedures (A) to (C). The white portion in an image obtained from the image processing performed by the foregoing procedures (A) to (C) is defined as a void, and the image processing software ImageJ is used to perform the measurement. A straight line with the longest distance from one surface to the other surface in the direction perpendicular to the fiber axis direction of a carbon fiber sampled is defined as the long axis of a cross section in the fiber diameter direction of the carbon fiber. The long axis is visually determined and, as a result of allowing the evaluation to be performed three times continuously, a straight line with the longest distance is used. With regard to the length of the longest distance from one end to the other end of the void, the length in the direction perpendicular to the fiber axis is defined as a width in the diameter direction of the void, and the length in the fiber axis direction is defined as a length in the fiber axis direction of the void. The length of the longest distance from one end to the other end of the void is visually determined and, as a result of allowing the evaluation to be performed three times continuously, a length with the longest distance is used. The shape of the void is assumed to be an elliptical shape and the void content ratio is calculated from the following equation. In this connection, a single fiber of the carbon fiber to be measured is randomly sampled from single fibers of the carbon fiber. The measurement is performed over the whole face of a portion of a length of 2.1 µm in the fiber axis direction of a carbon fiber, and three cross sections are measured therefore.

Void content ratio (% by area)=Σ{(width in diameter direction of respective voids (µm)}/2×(length in fiber axis direction of respective voids (µm))/2× π}/{carbon fiber diameter (µm)×2.1(µm)}

The distance from the midpoint of the long axis of a cross section in the fiber diameter direction to a void contained in the inside of the carbon fiber is determined as follows. First, using a focused ion beam (FIB), a thin section of the carbon fiber with a thickness of 100 nm is prepared along the direction perpendicular to the fiber axis thereof, a cross section in the fiber diameter direction of the carbon fiber is observed with a transmission electron microscope (TEM) at ten thousand magnifications, and the image processing is performed by the foregoing procedures (A) to (C). The white portion in an image obtained from the image processing performed by the foregoing procedures (A) to (C) is defined as a void, and the image processing software ImageJ is used to perform the measurement.

A straight line with the longest distance from one surface to the other surface in the direction perpendicular to the fiber axis direction of a carbon fiber sampled is defined as the long axis, and a point bisecting the straight line is defined as the midpoint of the long axis. The long axis is visually determined and, as a result of allowing the evaluation to be performed three times continuously, a straight line with the longest distance is used. When a straight line is drawn between the midpoint of the long axis of a cross section in the fiber diameter direction of the carbon fiber and a void contained in the inside of the carbon fiber, the length of the straight line with the shortest distance is defined as the distance from the midpoint of the long axis of the cross section in the fiber diameter direction to the void contained in the inside of the carbon fiber. In this connection, a single fiber of the carbon fiber to be measured is randomly sampled from single fibers of the carbon fiber. The measurement is performed throughout the cross section in the fiber diameter direction of a carbon fiber, and three cross sections are measured therefore.

The conditions of a transmission electron microscope (TEM) used for the void evaluation are as follows.

Apparatus: H-9000UHR available from Hitachi, Ltd.
Acceleration voltage: 300 kV
Observation magnification: ten thousand magnifications
Sectional Shape of Carbon Fiber Using a focused ion beam (FIB), a thin section of the carbon fiber with a thickness of 100 nm is prepared along the direction perpendicular to the fiber axis thereof, and a cross section in the fiber diameter direction of the carbon fiber is observed with a transmission electron microscope (TEM) at ten thousand magnifications to determine the sectional shape thereof in a TEM observed image. A straight line with the longest distance from one surface to the other surface in the direction perpendicular to the fiber axis direction of a carbon fiber is defined as the long axis, and a line segment which passes through the midpoint of the long axis and two points on the outer periphery and is orthogonal to the long axis is defined as the short axis. A cross section which has no dent portion on the outer periphery of the cross section and satisfies the following equation (1) is defined as a cross section with an almost circular shape, and a cross section which has no dent portion on the outer periphery of the cross section and satisfies the following equation (2) is defined as a cross section with an almost elliptical shape. In this connection, the dent portion refers to a dent with a depth of greater than or equal to 0.5 µm. In this context, the dent refers to a region, when a tangential line drawn at a point on the outer periphery of a cross section in the fiber diameter direction passes through the outer side of the cross section and is brought into contact with another point on the outer periphery, that is, when a tangential line allowed to pass through the outer side of the cross section and to be brought into contact with two or more points on the outer periphery of the cross section can be drawn, which is surrounded by the tangential line and the outer periphery of the cross section in the fiber diameter direction. Moreover, the depth refers to a length of the maximum distance from a point on the outer periphery of a cross section in the fiber diameter direction and on the outer periphery of a dent region to a tangential line constituting the outer periphery of the dent region.

$$1.00 \leq \text{long axis/short axis} < 1.03 \quad (1)$$

$$1.03 \leq \text{long axis/short axis} \leq 1.70 \quad (2)$$

In this connection, the conditions of a transmission electron microscope (TEM) are as follows.
Apparatus: H-9000UHR available from Hitachi, Ltd.
Acceleration voltage: 300 kV
Observation magnification: ten thousand magnifications
Tensile Modulus of Resin-Impregnated Strands and Elongation of Carbon Fiber The tensile modulus of resin-impregnated strands and the elongation of a carbon fiber are determined according to the following procedure in accordance with a resin-impregnated strand testing method in JIS-R-7608 (2004). As the resin formulation, a blend of "CELLOXIDE (registered trademark)" 2021P (available from Daicel Chemical Industries, Ltd.)/boron trifluoride monoethylamine (available from Tokyo Chemical Industry Co., Ltd.)/acetone=100/3/4 (parts by mass) is used, and as the curing condition, the condition of atmospheric pressure, a temperature of 125° C. and a time period of 30 minutes is used. Ten strands of the carbon fiber are measured therefore, and average values of ten measured values are defined as the tensile modulus of resin-impregnated strands and the elongation, respectively.
Fiber Diameter of Carbon Fiber With regard to a carbon fiber to be measured, the sectional shape is assumed to be a perfect circular shape, and the fiber diameter is determined from a single fiber cross-sectional area which is determined by dividing a mass per unit length (g/m) by the density (g/m$^3$) and furthermore by the number of filaments.
Measurement for Specific Gravity With regard to a fiber to be measured, 1 m of the fiber is sampled, o-dichloroethylene is used as a specific gravity liquid, and the specific gravity is measured by an Archimedes method. The number of samples to be measured is 3.
Tension in the Coagulation The tension is measured two times in the vicinity of a point from which coagulated fiber is allowed to travel out of the coagulation bath in the coagulation process, and the tension in the coagulation means an average value of the measured values. The tension is determined by sandwiching traveling coagulated fiber by a tensiometer to be measured for a load and dividing the load by the fineness (dtex) of the process coagulated fiber at a measuring point.

EXAMPLES

Example 1

A copolymer including 99.5 mol % of acrylonitrile and 0.5 mol % of itaconic acid was allowed to undergo a polymerization by a solution polymerization method using a polymerization initiator, while using dimethyl sulfoxide as a solvent, to produce a polyacrylonitrile-based copolymer. With regard to the polyacrylonitrile-based polymer produced, ammonium groups were introduced into the polyacrylonitrile-based copolymer, while neutralizing itaconic acid with ammonia gas, to obtain a spinning dope solution with a limiting viscosity of 3.4.

The spinning dope solution obtained was made into coagulated fiber by a dry-wet spinning method in which the spinning dope solution is once extruded into air from a spinning spinneret to be introduced into a coagulation bath containing an aqueous 70% dimethyl sulfoxide solution allowing the temperature thereof to be controlled to 25° C. At this time, the coagulation value was determined to be 36 g, the distance from the liquid surface of the coagulation bath to the guide to change the direction of the coagulation fiber in the coagulation bath was set to 10 cm, the time period until the coagulated fiber is brought into contact with a guide for changing the direction of the coagulation fiber in the coagulation bath was determined to be 0.25 second, and the tension in the coagulation of the coagulated fiber after allowed to travel out of the coagulation bath was determined to be 2.0 mN/dtex. This coagulated fiber was washed with water by a routine procedure, after which the coagulated fiber was heated by four hot water baths allowing temperatures of the first bath to the fourth bath to be elevated by 10° C. and allowing the temperature of the fourth bath to be set to 95° C. Moreover, at this time, the total draw magnification was set to 2.5 times. Subsequently, a fiber after the water bath-drawing was imparted with an amino-modified silicone-based silicone oil agent, subjected to a dry densification treatment using a heating roller at 160° C., and drawn by 3.7 times in pressurized steam to allow the whole draw magnification in spinning to become 13 times, and a polyacrylonitrile-based precursor fiber with a single filament fineness of 0.7 dtex was obtained. Next, the polyacrylonitrile-based precursor fiber obtained was subjected to a stabilization treatment in the air at a temperature of 250 to 280° C. while being drawn at a draw ratio of 1.00 to obtain a stabilized fiber. The stabilized fiber obtained was subjected to a pre-carbonization treatment in a nitrogen atmosphere at a temperature of 300 to 800° C. while being drawn at a draw ratio of 1.10 to obtain a pre-carbonized fiber. The pre-carbonized fiber obtained was subjected to a carbonization treatment in a nitrogen atmosphere at the maximum temperature of 1500° C. Subsequently, an aqueous sulfuric acid solution was used as an electrochemical solution, and the fiber was subjected to an electrochemical surface treatment, washed with water and dried, and then, imparted with a sizing agent to obtain a carbon fiber.

Coagulation conditions, the average width, average aspect ratio and content ratio of voids contained in the inside of the carbon fiber obtained, the void ratio within a distance of 2.0 µm from the midpoint of the long axis, the void ratio within a distance of 1.8 µm from the midpoint of the long axis, and the carbon fiber physical property were summarized in Table 1. In this connection, with regard to the respective items concerning the void described in Table 1, numerical values refer to average values of three measured values (N=3) observed in respective visual fields, and respective measured values of the average width of voids were determined to be 12, 15 and 18 nm, those of the average aspect ratio were determined to be 30, 35 and 25, those of the content ratio were determined to be 1.3, 1.5 and 1.6%, and those of the void ratio within a distance of 2.0 µm from the midpoint of the long axis were determined to be 93, 90 and 87%. (In this connection, in the following examples and comparative examples, with regard to the respective items concerning the void described in Table 1, numerical values refer to average values of three measured values (N=3) observed in respective visual fields.) Moreover, the sectional shape of the carbon fiber was determined to be an almost elliptical shape.

Example 2

A carbon fiber was obtained in the same manner as that in Example 1 except that the surface of the guide in the coagulation bath was treated and the frictional coefficient was controlled so that the tension in the coagulation of the coagulated fiber after allowed to travel out of the coagulation bath becomes 2.4 mN/dtex. Coagulation conditions, the average width, average aspect ratio and content ratio of voids contained in the inside of the carbon fiber obtained, the void ratio within a distance of 2.0 µm from the midpoint of the long axis, the void ratio within a distance of 1.8 µm from the midpoint of the long axis, and the carbon fiber physical property were summarized in Table 1. Moreover, the sectional shape of the carbon fiber was determined to be an almost elliptical shape.

Example 3

A carbon fiber was obtained in the same manner as that in Example 1 except that the surface of the guide in the coagulation bath was treated and the frictional coefficient was controlled so that the tension in the coagulation of the coagulated fiber after allowed to travel out of the coagulation bath becomes 1.2 mN/dtex. Coagulation conditions, the average width, average aspect ratio and content ratio of voids contained in the inside of the carbon fiber obtained, the void ratio within a distance of 2.0 µm from the midpoint of the long axis, the void ratio within a distance of 1.8 µm from the midpoint of the long axis, and the carbon fiber physical property were summarized in Table 1. Moreover, the sectional shape of the carbon fiber was determined to be an almost elliptical shape.

Example 4

A carbon fiber was obtained in the same manner as that in Example 1 except that the surface of the guide in the coagulation bath was treated and the frictional coefficient was controlled so that the tension in the coagulation of the coagulated fiber after allowed to travel out of the coagulation bath becomes 1.0 mN/dtex. Coagulation conditions, the average width, average aspect ratio and content ratio of voids contained in the inside of the carbon fiber obtained, the void ratio within a distance of 2.0 µm from the midpoint of the long axis, the void ratio within a distance of 1.8 µm from the midpoint of the long axis, and the carbon fiber physical property were summarized in Table 1. Moreover, the sectional shape of the carbon fiber was determined to be an almost elliptical shape.

Comparative Example 1

A carbon fiber was obtained in the same manner as that in Example 1 except that the surface of the guide in the coagulation bath was treated and the frictional coefficient was controlled so that the tension in the coagulation of the coagulated fiber after allowed to travel out of the coagulation bath becomes 0.8 mN/dtex. Coagulation conditions, the average width, average aspect ratio and content ratio of voids contained in the inside of the carbon fiber obtained, the void ratio within a distance of 2.0 µm from the midpoint of the long axis, the void ratio within a distance of 1.8 µm from the midpoint of the long axis, and the carbon fiber physical property were summarized in Table 1. Moreover, the sectional shape of the carbon fiber was determined to be an almost elliptical shape.

Comparative Example 2

A carbon fiber was obtained in the same manner as that in Example 1 except that the surface of the guide in the coagulation bath was treated and the frictional coefficient was controlled so that the tension in the coagulation of the coagulated fiber after allowed to travel out of the coagulation bath becomes 2.7 mN/dtex. Coagulation conditions, the average width, average aspect ratio and content ratio of voids contained in the inside of the carbon fiber obtained, the void ratio within a distance of 2.0 µm from the midpoint of the long axis, the void ratio within a distance of 1.8 µm from the midpoint of the long axis, and the carbon fiber physical property were summarized in Table 1. Moreover, the sectional shape of the carbon fiber was determined to be an almost elliptical shape.

Example 5

A carbon fiber was obtained in the same manner as that in Example 1 except that the concentration of an aqueous dimethyl sulfoxide solution allowing the temperature thereof to be controlled to 25° C. was set to 75% so that the coagulation value becomes 40 g. Coagulation conditions, the average width, average aspect ratio and content ratio of voids contained in the inside of the carbon fiber obtained, the void ratio within a distance of 2.0 µm from the midpoint of the long axis, the void ratio within a distance of 1.8 µm from the midpoint of the long axis, and the carbon fiber physical property were summarized in Table 1. Moreover, the sectional shape of the carbon fiber was determined to be an almost circular shape.

Comparative Example 3

A carbon fiber was obtained in the same manner as that in Example 1 except that the concentration of an aqueous dimethyl sulfoxide solution allowing the temperature thereof to be controlled to 25° C. was set to 81% so that the coagulation value becomes 50 g. Coagulation conditions, the average width, average aspect ratio and content ratio of voids contained in the inside of the carbon fiber obtained, the void ratio within a distance of 2.0 µm from the midpoint of the long axis, the void ratio within a distance of 1.8 µm from the midpoint of the long axis, and the carbon fiber physical property were summarized in Table 1. Moreover, the sectional shape of the carbon fiber was determined to be an almost elliptical shape.

Comparative Example 4

A carbon fiber was obtained in the same manner as that in Example 1 except that the concentration of an aqueous dimethyl sulfoxide solution allowing the temperature thereof to be controlled to 25° C. was set to 40% so that the coagulation value becomes 25 g. Coagulation conditions, the average width, average aspect ratio and content ratio of voids contained in the inside of the carbon fiber obtained, the void ratio within a distance of 2.0 µm from the midpoint of the long axis, the void ratio within a distance of 1.8 µm from the midpoint of the long axis, and the carbon fiber physical property were summarized in Table 1. A high level of tensile modulus of resin-impregnated strands and a high level of elongation were attained, but the void content ratio in the inside of the carbon fiber was low and the carbon fiber was not sufficiently reduced in weight. Moreover, the sectional shape of the carbon fiber was determined to be an almost elliptical shape.

Example 6

A carbon fiber was obtained in the same manner as that in Example 1 except that the distance from the liquid surface of the coagulation bath to the guide for changing the direction of the coagulation fiber in the coagulation bath was set to 4 cm and the time period until the coagulated fiber is brought into contact with the guide for changing the direction of the coagulation fiber in the coagulation bath was set to 0.10 second. Coagulation conditions, the average width, average aspect ratio and content ratio of voids contained in the inside of the carbon fiber obtained, the void ratio within a distance of 2.0 µm from the midpoint of the long axis, the void ratio within a distance of 1.8 µm from the midpoint of the long axis, and the carbon fiber physical property were summarized in Table 1. Moreover, the sectional shape of the carbon fiber was determined to be an almost elliptical shape.

Comparative Example 5

A carbon fiber was obtained in the same manner as that in Example 1 except that the distance from the liquid surface of the coagulation bath to the guide for changing the direction of the coagulation fiber in the coagulation bath was set to 2 cm and the time period until the coagulated fiber is brought into contact with the guide for changing the direction of the coagulation fiber in the coagulation bath was set to 0.05 second. Coagulation conditions, the average width, average aspect ratio and content ratio of voids contained in the inside of the carbon fiber obtained, the void ratio within a distance of 2.0 µm from the midpoint of the long axis, the void ratio within a distance of 1.8 µm from the midpoint of the long axis, and the carbon fiber physical property were summarized in Table 1. Moreover, the sectional shape of the carbon fiber was determined to be an almost elliptical shape.

Example 7

A carbon fiber was obtained in the same manner as that in Example 1 except that the distance from the liquid surface of the coagulation bath to the guide for changing the direction of the coagulation fiber in the coagulation bath was set to 16 cm and the time period until the coagulated fiber is brought into contact with the guide for changing the direction of the coagulation fiber in the coagulation bath was set to 0.40 second. Coagulation conditions, the average width, average aspect ratio and content ratio of voids contained in the inside of the carbon fiber obtained, the void ratio within a distance of 2.0 µm from the midpoint of the long axis, the void ratio within a distance of 1.8 µm from the midpoint of the long axis, and the carbon fiber physical property were summarized in Table 1. Moreover, the sectional shape of the carbon fiber was determined to be an almost elliptical shape.

Comparative Example 6

A carbon fiber was obtained in the same manner as that in Example 1 except that the distance from the liquid surface of the coagulation bath to the guide for changing the direction of the coagulation fiber in the coagulation bath was set to 24 cm and the time period until the coagulated fiber is brought into contact with the guide for changing the direction of the coagulation fiber in the coagulation bath was set to 0.60 second. Coagulation conditions, the average width, average aspect ratio and content ratio of voids contained in the inside of the carbon fiber obtained, the void ratio within a distance of 2.0 µm from the midpoint of the long axis, the void ratio within a distance of 1.8 µm from the midpoint of the long axis, and the carbon fiber physical property were summarized in Table 1. A high level of tensile modulus of resin-impregnated strands and a high level of elongation were attained, but the void content ratio in the inside of the carbon fiber was low and the carbon fiber was not sufficiently reduced in weight. Moreover, the sectional shape of the carbon fiber was determined to be an almost elliptical shape.

Example 8

A carbon fiber was obtained in the same manner as that in Example 1 except that the extrusion amount of the spinning dope solution was adjusted so that the single filament fineness of the polyacrylonitrile-based precursor fiber becomes 1.0 dtex. Coagulation conditions, the average width, average aspect ratio and content ratio of voids contained in the inside of the carbon fiber obtained, the void ratio within a distance of 2.0 µm from the midpoint of the long axis, the void ratio within a distance of 1.8 µm from the midpoint of the long axis, and the carbon fiber physical property were summarized in Table 1. The tensile modulus of resin-impregnated strands was lowered due to the difference in tensile modulus existing between inner and outer portions of the carbon fiber since the fiber diameter became larger than that in Examples 1 to 7, but reduced weight thereof and the carbon fiber physical property were achieved at the same time. Moreover, the sectional shape of the carbon fiber was determined to be an almost elliptical shape.

Example 9

A carbon fiber was obtained in the same manner as that in Example 4 except that the extrusion amount of the spinning dope solution was adjusted so that the single filament fineness of the polyacrylonitrile-based precursor fiber becomes 1.0 dtex. Coagulation conditions, the average width, average aspect ratio and content ratio of voids contained in the inside of the carbon fiber obtained, the void ratio within a distance of 2.0 µm from the midpoint of the long axis, the void ratio within a distance of 1.8 µm from the midpoint of the long axis, and the carbon fiber physical property were summarized in Table 1. The tensile modulus of resin-impregnated strands was lowered due to the difference in tensile modulus existing between inner and outer portions of the carbon fiber since the fiber diameter became larger than that in Examples 1 to 7, but reduced weight thereof and the carbon fiber physical property were achieved at the same time. Moreover, the sectional shape of the carbon fiber was determined to be an almost elliptical shape.

property were summarized in Table 1. Moreover, the sectional shape of the carbon fiber was determined to be an almost elliptical shape.

TABLE 1

| | Coagulation conditions | | | Void | | | | | Carbon fiber physical property | | | |
|---|---|---|---|---|---|---|---|---|---|---|---|---|
| | | Time period | | | | | | Void ratio* | | | | |
| | Coagulation value g | until tension is imparted Second | Coagulation tension mN/dtex | Average width nm | Average aspect ratio — | Content ratio % by area | Within distance of 2.0 μm % | Within distance of 1.8 μm % | Fiber diameter μm | Specific gravity — | Strand elastic modulus GPa | Elongation % |
| Example 1 | 36 | 0.25 | 2.0 | 15 | 30 | 1.5 | 90 | 88 | 5.4 | 1.76 | 325 | 2.0 |
| Example 2 | 36 | 0.25 | 2.4 | 13 | 45 | 1.6 | 85 | 81 | 5.4 | 1.76 | 326 | 1.9 |
| Example 3 | 36 | 0.25 | 1.2 | 14 | 5.0 | 1.4 | 88 | 82 | 5.4 | 1.75 | 312 | 2.0 |
| Example 4 | 36 | 0.25 | 1.0 | 15 | 3.0 | 1.4 | 82 | 77 | 5.4 | 1.75 | 304 | 1.9 |
| Comparative Example 1 | 36 | 0.25 | 0.8 | 13 | 1.2 | 1.4 | 85 | 81 | 5.4 | 1.75 | 284 | 1.6 |
| Comparative Example 2 | 36 | 0.25 | 2.7 | 14 | 52 | 1.6 | 83 | 78 | 5.4 | 1.76 | 326 | 1.6 |
| Example 5 | 40 | 0.25 | 2.0 | 25 | 31 | 3.0 | 82 | 80 | 5.4 | 1.73 | 320 | 1.9 |
| Comparative Example 3 | 50 | 0.25 | 2.0 | 40 | 29 | 7.0 | 81 | 78 | 5.4 | 1.70 | 307 | 1.5 |
| Comparative Example 4 | 25 | 0.25 | 2.0 | 8 | 30 | 0.2 | 82 | 80 | 5.4 | 1.80 | 329 | 1.9 |
| Example 6 | 36 | 0.10 | 2.0 | 80 | 27 | 3.2 | 70 | 62 | 5.4 | 1.73 | 319 | 1.7 |
| Comparative Example 5 | 36 | 0.05 | 2.0 | 120 | 25 | 5.0 | 50 | 41 | 5.4 | 1.72 | 313 | 1.2 |
| Example 7 | 36 | 0.40 | 2.0 | 3 | 33 | 0.5 | 91 | 86 | 5.4 | 1.80 | 328 | 2.1 |
| Comparative Example 6 | 36 | 0.60 | 2.0 | 2 | 35 | 0.3 | 91 | 90 | 5.4 | 1.80 | 329 | 2.1 |
| Example 8 | 36 | 0.25 | 2.0 | 14 | 30 | 1.4 | 92 | 90 | 6.9 | 1.75 | 295 | 2.1 |
| Example 9 | 36 | 0.25 | 1.0 | 15 | 4.0 | 1.5 | 87 | 86 | 6.9 | 1.76 | 274 | 2.0 |
| Comparative Example 7 | 36 | 0.25 | 0.6 | 13 | 1.2 | 1.5 | 90 | 89 | 6.9 | 1.76 | 256 | 1.6 |
| Comparative Example 8 | 32 | 0.25 | 2.7 | 14 | 51 | 1.6 | 88 | 86 | 6.9 | 1.76 | 293 | 1.3 |

*representing the void ratio within a distance of 2.0 μm from the midpoint of the major axis and the void ratio within a distance of 1.8 μm from the midpoint of the major axis Comparative Example 7

A carbon fiber was obtained in the same manner as that in Comparative Example 1 except that the extrusion amount of the spinning dope solution was adjusted so that the single filament fineness of the polyacrylonitrile-based precursor fiber becomes 1.0 dtex. Coagulation conditions, the average width, average aspect ratio and content ratio of voids contained in the inside of the carbon fiber obtained, the void ratio within a distance of 2.0 μm from the midpoint of the long axis, the void ratio within a distance of 1.8 μm from the midpoint of the long axis, and the carbon fiber physical property were summarized in Table 1. Moreover, the sectional shape of the carbon fiber was determined to be an almost elliptical shape.

Comparative Example 8

A carbon fiber was obtained in the same manner as that in Comparative Example 2 except that the extrusion amount of the spinning dope solution was adjusted so that the single filament fineness of the polyacrylonitrile-based precursor fiber becomes 1.0 dtex. Coagulation conditions, the average width, average aspect ratio and content ratio of voids contained in the inside of the carbon fiber obtained, the void ratio within a distance of 2.0 μm from the midpoint of the long axis, the void ratio within a distance of 1.8 μm from the midpoint of the long axis, and the carbon fiber physical

The invention claimed is:

1. A carbon fiber having a void content ratio in a cross section in a fiber axis direction including a long axis of a cross section in a fiber diameter direction greater than or equal to 0.3% by area and less than or equal to 5.0% by area, an average aspect ratio of the void greater than or equal to 2.0 and less than or equal to 50, and average width of the void in a cross section in a fiber diameter direction greater than or equal to 13 nm and less than or equal to 100 nm.

2. The carbon fiber according to claim 1, wherein the average aspect ratio of the void is greater than or equal to 10 and less than or equal to 50.

3. The carbon fiber according to claim 2, wherein the void content ratio is greater than or equal to 0.3% by area and less than or equal to 2.0% by area.

4. The carbon fiber according to claim 2, wherein, at a region within a distance of 2.0 μm from a midpoint of the long axis of the cross section in the fiber diameter direction, 80% or more of voids of the number of voids on the cross section are contained therein.

5. The carbon fiber according to claim 2, having a tensile modulus of resin-impregnated strands greater than or equal to 220 GPa and less than or equal to 400 GPa, and an elongation greater than or equal to 1.7% and less than or equal to 2.7%.

6. A method of producing the carbon fiber according to claim 2, comprising:
    spinning a polyacrylonitrile-based spinning dope solution into fiber through a coagulation process to obtain a polyacrylonitrile-based precursor fiber;

subjecting the polyacrylonitrile-based precursor fiber to a stabilization treatment under an oxidizing atmosphere at 200 to 300° C. to obtain a stabilized fiber;

subjecting the stabilized fiber to a pre-carbonization treatment under an inert atmosphere at 500 to 1200° C. to obtain a pre-carbonized fiber; and subjecting the pre-carbonized fiber to a carbonization treatment under an inert atmosphere at 1200 to 3000° C. to obtain a carbon fiber, wherein tension in the coagulation during coagulation in the spinning process is greater than or equal to 1.0 mN/dtex and less than or equal to 2.5 mN/dtex.

7. The carbon fiber according to claim 1, wherein the void content ratio is greater than or equal to 0.3% by area and less than or equal to 2.0% by area.

8. The carbon fiber according to claim 7, wherein, at a region within a distance of 2.0 μm from a midpoint of the long axis of the cross section in the fiber diameter direction, 80% or more of voids of the number of voids on the cross section are contained therein.

9. The carbon fiber according to claim 7, having a tensile modulus of resin-impregnated strands greater than or equal to 220 GPa and less than or equal to 400 GPa, and an elongation greater than or equal to 1.7% and less than or equal to 2.7%.

10. A method of producing the carbon fiber according to claim 7, comprising:

spinning a polyacrylonitrile-based spinning dope solution into fiber through a coagulation process to obtain a polyacrylonitrile-based precursor fiber;

subjecting the polyacrylonitrile-based precursor fiber to a stabilization treatment under an oxidizing atmosphere at 200 to 300° C. to obtain a stabilized fiber;

subjecting the stabilized fiber to a pre-carbonization treatment under an inert atmosphere at 500 to 1200° C. to obtain a pre-carbonized fiber; and subjecting the pre-carbonized fiber to a carbonization treatment under an inert atmosphere at 1200 to 3000° C. to obtain a carbon fiber, wherein tension in the coagulation during coagulation in the spinning process is greater than or equal to 1.0 mN/dtex and less than or equal to 2.5 mN/dtex.

11. The carbon fiber according to claim 1, wherein, at a region within a distance of 2.0 μm from a midpoint of the long axis of the cross section in the fiber diameter direction, 80% or more of voids of the number of voids on the cross section are contained therein.

12. The carbon fiber according to claim 11, having a tensile modulus of resin-impregnated strands greater than or equal to 220 GPa and less than or equal to 400 GPa, and an elongation greater than or equal to 1.7% and less than or equal to 2.7%.

13. A method of producing the carbon fiber according to claim 11, comprising:

spinning a polyacrylonitrile-based spinning dope solution into fiber through a coagulation process to obtain a polyacrylonitrile-based precursor fiber;

subjecting the polyacrylonitrile-based precursor fiber to a stabilization treatment under an oxidizing atmosphere at 200 to 300° C. to obtain a stabilized fiber;

subjecting the stabilized fiber to a pre-carbonization treatment under an inert atmosphere at 500 to 1200° C. to obtain a pre-carbonized fiber; and subjecting the pre-carbonized fiber to a carbonization treatment under an inert atmosphere at 1200 to 3000° C. to obtain a carbon fiber, wherein tension in the coagulation during coagulation in the spinning process is greater than or equal to 1.0 mN/dtex and less than or equal to 2.5 mN/dtex.

14. The carbon fiber according to claim 1, having a tensile modulus of resin-impregnated strands greater than or equal to 220 GPa and less than or equal to 400 GPa, and an elongation greater than or equal to 1.7% and less than or equal to 2.7%.

15. A method of producing the carbon fiber according to claim 14, comprising:

spinning a polyacrylonitrile-based spinning dope solution into fiber through a coagulation process to obtain a polyacrylonitrile-based precursor fiber;

subjecting the polyacrylonitrile-based precursor fiber to a stabilization treatment under an oxidizing atmosphere at 200 to 300° C. to obtain a stabilized fiber;

subjecting the stabilized fiber to a pre-carbonization treatment under an inert atmosphere at 500 to 1200° C. to obtain a pre-carbonized fiber; and subjecting the pre-carbonized fiber to a carbonization treatment under an inert atmosphere at 1200 to 3000° C. to obtain a carbon fiber, wherein tension in the coagulation during coagulation in the spinning process is greater than or equal to 1.0 mN/dtex and less than or equal to 2.5 mN/dtex.

16. A method of producing the carbon fiber according to claim 1, comprising:

spinning a polyacrylonitrile-based spinning dope solution into fiber through a coagulation process to obtain a polyacrylonitrile-based precursor fiber;

subjecting the polyacrylonitrile-based precursor fiber to a stabilization treatment under an oxidizing atmosphere at 200 to 300° C. to obtain a stabilized fiber;

subjecting the stabilized fiber to a pre-carbonization treatment under an inert atmosphere at 500 to 1200° C. to obtain a pre-carbonized fiber; and subjecting the pre-carbonized fiber to a carbonization treatment under an inert atmosphere at 1200 to 3000° C. to obtain a carbon fiber, wherein tension in the coagulation during coagulation in the spinning process is greater than or equal to 1.0 mN/dtex and less than or equal to 2.5 mN/dtex.

\* \* \* \* \*